Dec. 5, 1939.　　　　A. FEIGELSON　　　　2,182,077
DUMP TRAILER
Filed July 26, 1937
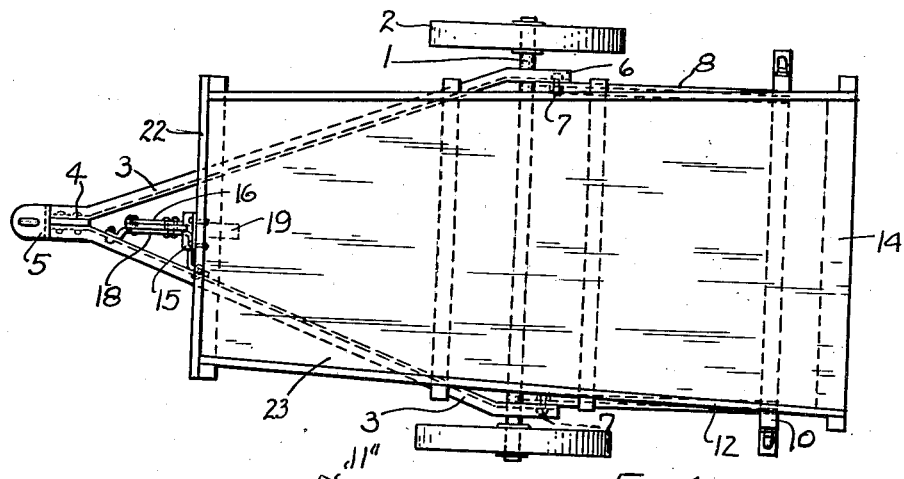
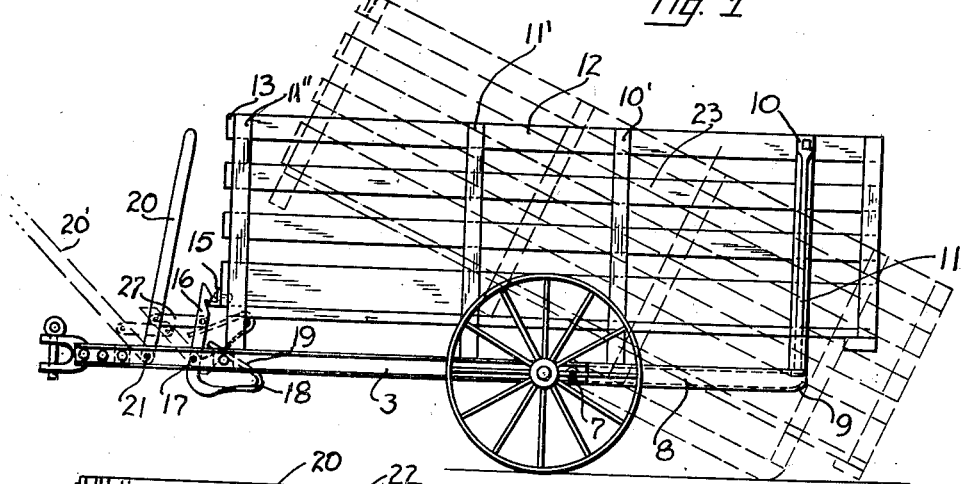
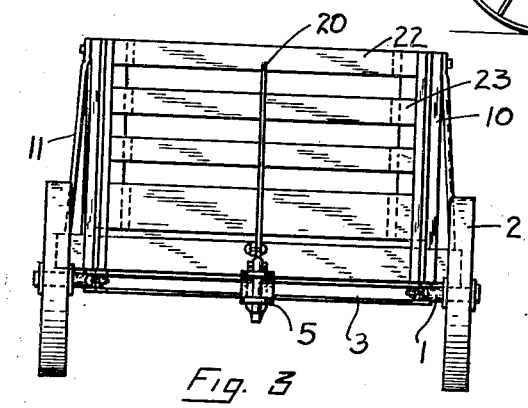
ALEX FEIGELSON　INVENTOR.
BY Jesse R. Stone
Lister B. Clark
ATTORNEYS Patented Dec. 5, 1939

2,182,077

UNITED STATES PATENT OFFICE 2,182,077

DUMP TRAILER

Alexander Feigelson, Beaumont, Tex.

Application July 26, 1937, Serial No. 155,647

1 Claim. (Cl. 298—5)

My invention relates to dump trailers adapted to support heavy loads, said trailer being propelled by means of a tractor or team.

My invention is designed particularly for use in agricultural work although obviously is not confined to such use.

It is an object of the invention to provide a load supporting trailer which may be easily tiltable to allow the load to slide therefrom, the movement of the load being accomplished through the force of gravity.

It is a further object of the invention to provide an efficient device for latching the load support in upright position, but allowing the easy release of said latch and the tilting of the support.

It is another object of the invention to so mount the load containing a body that it may be easily tilted into load releasing position.

I also desire to form the box or body of the trailer in such manner that the load may be easily removed therefrom.

In the drawing herewith, Fig. 1 is a top plan view of a trailer constructed in accordance with the invention.

Fig. 2 is a side elevation thereof; and

Fig. 3 is a front elevation thereof.

In constructing my invention I provide an axle 1 which is supported at each end upon wheels 2, the tires of which are made wide enough to operate upon soft ground.

Mounted upon the axle is a frame, the forward portion of which is bent in V-shape so as to converge beyond the forward end of the body 23. This frame is made up of two structural steel channel bars 3, the forward ends of which are bolted together at 4, and secured to a clevis or other attaching device 5. Toward the rearward end of the V-shaped frame the legs of the V are formed parallel at 6 and are supported directly upon the axle 1.

The ends of the frame 3, which project to the rear of the axle are pivotally connected at 7 to a rearward extension 8 of the frame, which is preferably formed as a part of the body 23 of the box. As will be seen best in Fig. 2, the frame extension 8 projects beyond the wheels of the trailer a distance somewhat shorter than the length of the forward frame 3. At its rearward end the two side members are rounded at 9 so that they may be dragged upon the ground when the load is being dumped.

The rearward end of the frame is formed with uprights 10, which form a portion of the body 23. They have brace rods 11 at the side thereof and form substantial supports for the sides of the body. The body has a plurality of lateral supports, the support 10' being also mounted upon the tiltable rearward extension 8. There are two forward upright portions to the body shown at 11' and 11", which are not secured to the frame of the trailer. The body includes a plurality of longitudinal side members 12, which together make up an enclosing body to receive the load as, for example, bundles of grain or a load of hay, or the like.

The forward end of the body is closed by a plurality of cross members 13. The rearward end shown at 14 in Fig. 1 is open. It is further to be noted that the longitudinal side members 12 converge somewhat from the rearward end to the forward end. The reason for this is to allow the load to be removed easily from the forward to the rearward end as the load is dumped.

While the load is being placed within the body the body is held in normal horizontal position by means of a latching device mounted upon the forward end of the frame. This latch includes a transverse plate preferably of angle iron form 15. This plate is placed closely adjacent the lower end of the body, the lower web of the angle iron projecting forwardly.

To cooperate with this plate I have a lever including an upright arm 16 which is notched on its rearward side to engage with the angle iron. This arm is pivoted at 17 to a bracket 18 on the frame. The arm is extended below the frame and curved rearwardly and again re-curved at 18 upwardly toward the arm 16. This re-curved portion of the arms furnishes a thrust member 19, which engages with the lower end of the body.

The lever 16 is operated by means of a lever arm 20, which is pivoted to the frame at 21. It is connected to the arm 16 by means of a link 27, positioned upwardly from the frame. It will be noted that when the operator grasps the lever arm 20 and pulls it toward the dotted line position 20' it will move the latching member to release the body and will also move the thrust member 19 upwardly to exert a thrust upon the forward end of the body and cause it to tilt upwardly.

When the box is loaded with bundles of grain, for example, and is released and tilted as has just been described, the rearward end of the load will be sufficiently heavy to cause the box to tilt downwardly to the dotted line position shown in Fig. 2, and the load will slide out of the rearward end. As the trailer is moved forward the load will engage with the ground and the trailer will be drawn forwardly away from the load, leaving it deposited on the ground. When the load has been thus removed from the body, the forward portion of the box being somewhat heavier than the rearward end will cause the body to tilt automatically back into its horizontal position and to automatically latch itself ready to receive another load.

The advantages of this construction lie in the fact that the body is convenient to receive heavy loads of produce and that when it becomes desirable to dump the load this may also be easily accomplished without the use of special equipment.

The operator standing upon the tractor or team which draws the trailer may reach back and engage the lever arm 20 and accomplish the dumping of the load by a simple pull exerted upon the lever. As the rearward end of the body is somewhat wider than the forward end the weight of the load is fairly evenly balanced and a slight push exerted by the thrust arm 19 is all that is necessary to cause the load to dump. In normal practice the driver will not stop to dump the trailer but will simply drive straight ahead allowing the load to slide out the rearward end of the body and the body will automatically right itself when the load has been dumped.

Although this is especially adapted for use with grain, hay, and the like, it will be obvious that it is operative for use in carrying various other loads and I do not wish to be confined to any particular use for my trailer.

What is claimed as new is:

An axle, wheels thereon, a channel iron frame including two side members converging forwardly, said side members having short projections rearwardly of said axles, frame extensions pivoted to said projections and in the same plane therewith, a load carrying box mounted rigidly upon said extensions and overlying said frame with the floor thereof spaced above said frame and projecting to the rear of said extensions, said box having sides spaced comparatively wide apart at the rearward end and converging toward the forward end, whereby a load will overbalance it at the rearward end while it will assume a level position by its own weight when unloaded, means to latch said box to said frame, said latching means being releasable to dump a load.

ALEXANDER FEIGELSON.